United States Patent
Bovino

(10) Patent No.: US 6,977,809 B2
(45) Date of Patent: Dec. 20, 2005

(54) PORTABLE COMPUTER CASE

(75) Inventor: Jerald A. Bovino, 2201 S. Ocean Dr., Apartment 2803, Hollywood, FL (US) 33019

(73) Assignee: Jerald A. Bovino, Hollywood, FL (US)

(*) Notice: Subject to any disclaimer, the term of this patent is extended or adjusted under 35 U.S.C. 154(b) by 131 days.

(21) Appl. No.: 10/452,824

(22) Filed: Jun. 2, 2003

(65) Prior Publication Data

US 2004/0022021 A1 Feb. 5, 2004

Related U.S. Application Data

(60) Provisional application No. 60/386,953, filed on Jun. 7, 2002.

(51) Int. Cl.[7] .............................................. G06F 1/16
(52) U.S. Cl. .................. 361/683; 206/70; 224/600; 224/258; 190/102; 190/900
(58) Field of Search .................. 361/679–686; 206/305, 306, 320, 720; 224/575–600, 162, 224/258; 190/102, 109, 110, 111, 900–902

(56) References Cited

U.S. PATENT DOCUMENTS

| | | |
|---|---|---|
| 4,556,159 A | 12/1985 | Swain |
| 4,898,009 A | 2/1990 | Lakoski et al. |
| 5,682,993 A * | 11/1997 | Song .......................... 206/320 |
| 5,694,267 A | 12/1997 | Morehouse et al. |
| 5,796,575 A | 8/1998 | Podwalny et al. |
| 5,816,464 A | 10/1998 | Seiler |
| 5,881,934 A | 3/1999 | Hung |
| 5,897,039 A * | 4/1999 | Swenke ....................... 224/162 |
| 5,931,297 A | 8/1999 | Weill et al. |
| 5,960,952 A | 10/1999 | Chen |
| 5,971,148 A | 10/1999 | Jackson |
| 5,999,416 A | 12/1999 | McAnally et al. |
| 6,006,243 A | 12/1999 | Karidis |
| 6,015,195 A | 1/2000 | Anderson et al. |
| 6,028,765 A | 2/2000 | Swindler et al. |
| 6,053,381 A * | 4/2000 | Fahl et al. ................... 224/153 |
| 6,179,122 B1 * | 1/2001 | Moncrief et al. ........... 206/320 |
| 6,208,504 B1 * | 3/2001 | Cho et al. .................... 361/683 |
| 6,213,266 B1 * | 4/2001 | Hollingsworth ............. 190/108 |
| 6,262,886 B1 * | 7/2001 | DiFonzo et al. ............ 361/683 |
| 6,442,018 B1 * | 8/2002 | Dinkin ........................ 361/683 |
| 6,532,152 B1 * | 3/2003 | White et al. ................. 361/683 |
| 2002/0085342 A1 * | 7/2002 | Chen et al. .................. 361/683 |

* cited by examiner

Primary Examiner—Lisa Lea-Edmonds
(74) Attorney, Agent, or Firm—Emch, Schaffer, Schaub & Porcello, Co., L.P.A.

(57) ABSTRACT

The present invention is directed to a portable computer having an integral case that incorporates a resilient material to protect the portable computer from wear and tear encountered when transporting and/or using the portable computer. The integral case also includes a retractable strap means that can be utilized to facilitate the transporting of the portable computer. The integral case for the portable computer also includes an identification pocket on the exterior surface of the integral case for incorporating identification documents for the portable computer.

10 Claims, 1 Drawing Sheet

PORTABLE COMPUTER CASE

RELATED APPLICATION

The present application is related to and claims the benefit of U.S. Provisional Application No. 60/386,953, filed on Jun. 7, 2002.

BACKGROUND OF THE INVENTION

The present invention is generally directed to a portable computer and more particularly a case in which the portable computer can be housed. Portable computer that are manufactured today are positioned an openable case where the case is integral with the portable computer. However, the openable case is not designed to provide a convenient means for carrying the portable computer or for protecting the portable computer from wear and tear during the transporting of the portable computer. Accordingly, a separate protective case is utilized with the portable computer when it is necessary to transport the portable computer or to protect the portable computer from levels of wear and tear that are not normally encountered when using such a portable computer. The protective case is designed to fit around the portable computer and usually has a zipper or other securing means that allows the protective case to be secured around the portable computer. In many instances, the protective case has a layer of padding or other protective material in the interior of the protective case to provide additional protection for the protective computer. A handle or carrying strap is also usually associated with the protective case so that the portable computer can be more easily carried when the portable computer is being transported.

The protective case functions very effectively to protect the portable computer and provide a convenient means for transporting the portable computer. However, when not in use, it is necessary to store the protective case and to make sure the protective case is in a convenient location when it is desired to transport the portable computer. In addition, when the portable computer is being transported through areas where there are security concerns such as airports or into buildings with a high level of security, it is frequently necessary to remove the portable computer from the protective case so that the computer can be inspected and/or passed through an X-ray device. At airports, in particular, it has become increasingly time consuming to remove a portable computer from the protective case so that the computer can be passed through the X-ray inspection equipment. The portable computers normally do not have any identification means to identify the owner or user of the portable computer. Accordingly, it may be difficult to identify a particular portable computer after it has passed through the X-ray equipment especially if there is any confusion or additional processing that is necessary at the security checkpoint. The portable computers that are removed from the protective case for security inspection are also less protected and subject to being damages during the security checking operation. There is also a possibility that the computer can be dropped or otherwise damaged when it is being removed from or repositioned in the portable case during the security checking process.

Accordingly, it is an object of the present invention provide a portable computer that does not require a separate carrying case to protect the portable computer from wear and tear during the transporting of the portable computer.

It is a further object of the invention to provide a portable computer that has an identification means build into the exterior case of the portable computer to facilitate proper identification of the portable computer.

It is a further object of the invention to provide a case for a portable computer that has a carrying means that can be utilized to facilitate the transporting of the portable computer.

SUMMARY OF THE INVENTION

The present invention is directed to a portable computer having an integral case that incorporates a resilient material to protect the portable computer from wear and tear encountered when transporting and/or using the portable computer. The integral case also includes a retractable strap means that can be utilized to facilitate the transporting of the portable computer. The integral case for the portable computer also includes an identification pocket on the exterior surface of the integral case for incorporating identification documents for the portable computer.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT

This invention relates to a portable computer and more particularly the case in which the portable computer is housed. The features of the invention will be more readily understood by referring to the attached drawings in connection with the following description.

Figure 1:
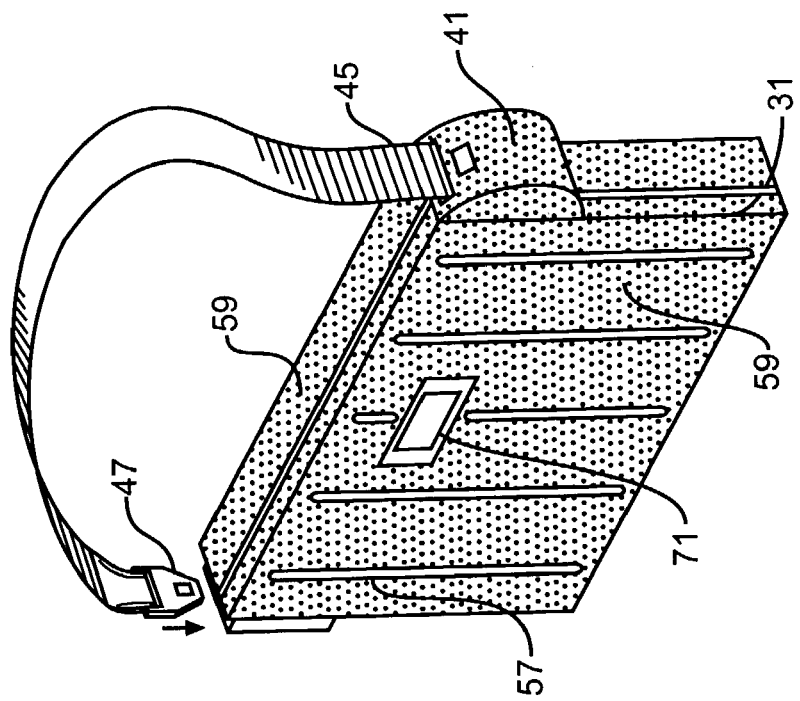
FIG. 1 is a perspective view of the portable computer case of the present invention.
Figure 2:
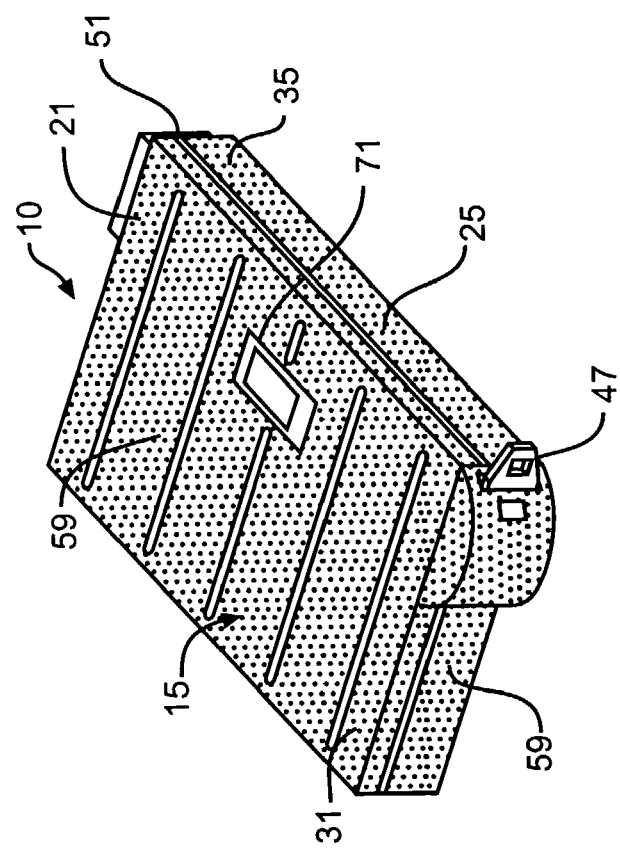
FIG. 2 is a perspective view of the case for a portable computer of the present invention.

The portable computer 10 as shown in FIGS. 1 and 2 has an outer case 15 in which the computer is positioned. The case 15 forms the outer structure of the computer 10 and is an integral part of the computer. The outer case 15 is designed to protect the computer when the computer is not being used. The outer case has a first section 21 and a second section 25 that are designed to encase the computer. The first section 21 and the second section 25 are secured together at a first end 31 by a hinge type of securing means (not shown) as is well known in the art. The second end 35 of the case 15 includes a releasable closure or locking mechanism (not shown) as is well known in the art to secure the first and second sections 21 and 25, respectively, in a closed position where the case 15 totally encloses the portable computer 10 as shown in FIGS. 1 and 2. Positioned on one end of the first section 21 of the case 15 is a retractor mechanism 41. Retractably positioned in the retractable mechanism 41 is a strap 45 that can be advanced from the retractor mechanism 41. A hook means 47 is secured to the end of the strap 45 that is advanced from the retracting means 41. The hook means 47 is designed to lockably engage a clasp means 51 positioned on the edge of the first section 21 of the case 15 that is opposite from the retraction means 41. The clasp means 51 is designed to releasably engage the hook means 47 so that the strap 45 can form a convenient means for carrying the portable computer 10 and the strap means can be released and retracted into the retractor means 45 to conveniently store the strap 45 when it is no longer needed to carry the portable computer.

Positioned on the exterior surface of the first section 21 and second section 25 of the case 15 are a plurality of ribs 57. The ribs 57 are made from a resilient material such as rubber, urethane, nylon or similar products that can provide cushioning for the case 15 and the portable computer 10 positioned in the interior of the case. The ribs 57 are disposed on the case 15 in areas that will receive the maximum amount of wear and tear during transporting and using the portable computer 10. It is also possible to clad the entire exterior surface of the first section 21 and second section 25 of the case 15 with a resilient material 59 of the type previously described. With such an entire covering of resilient material 59, the entire case 15 is provided with a shock absorbing cover that assist in protecting the case 15 and the portable computer located in the interior of the case. It is also possible to utilize the protective cover of resilient material 59 on the entire case 15 with individual ribs 57 of a resilient material to provide additional security and shock absorption for the computer 10 in the case 15.

An additional feature of the invention is that an identification pocket 71 can be positioned on the first section 21, the second section 25 or both the first and second sections to provide a means to identify the owner of the portable computer. It is anticipated that the identification pocket 71 would be capable of receiving and retaining an identification document for the owner of the portable computer.

In use, the protective cover of resilient material 59 and/or the ribs 57 of resilient material provide a case 15 that is capable of protecting the computer 15 from wear and tear. The case 15 of the present invention eliminates the need for a separate carrying case to transport and protect a portable computer. As the portable computer 10 does not have a separate case, it is not necessary to remove the portable computer from the separate case at security monitoring locations. There is also no need to keep track of and store a separate case when the portable computer 10 is not being transported. In addition, the identification pocket 71 provides a means whereby the portable computer 10 can be identified without opening the case 15.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A portable computer comprising:
    an openable case defining an exterior surface for holding the computer; and
    a plurality of resilient ribs positioned on said exterior surface of said case wherein said resilient ribs protects said computer from wear and tear during the transporting and use of the computer.

2. The computer of claim 1 wherein the resilient ribs are comprised of a material selected form the group of rubber, urethane or nylon.

3. The computer of claim 1 wherein a retractable carrying strap is positioned in a retractor mechanism that is connected to the case wherein the strap can be extended from the retractor mechanism and secured to a clasp means on the case to form a carrying strap to assist in carrying the computer and the strap can be retracted into the retractor means when the carrying strap is not being used to transport the computer.

4. The computer of claim 1 wherein said plurality of resilient ribs are positioned on the case in locations to absorb impacts that can effect the operation or functioning of the computer.

5. The computer of claim 1 wherein a pocket is positioned on the exterior surface of the case to received identification information for the computer.

6. A portable computer comprising:
    an openable case defining an exterior surface for holding the computer;
    a plurality of resilient ribs positioned on the exterior surface of said case, and
    a resilient material positioned on at least a portion of the exterior surface of the case, the resilient material and resilient ribs protect the computer form wear and tear during the transporting and use of the computer.

7. The computer of claim 6 wherein the resilient material covers substantially the entire exterior surface of the case.

8. The computer of claim 6 wherein the resilient material is comprised of a material selected from the group of rubber urethane or nylon.

9. The computer of claim 6 wherein a retractable carrying strap is positioned in a retractor mechanism that is connected to the case wherein the strap can be extended from the retractor mechanism and secured to a clasp means on the case to form a carrying strap to assist in carrying the computer and the strap can be retracted into the retractor means when the carrying strap is not being used to transport the computer.

10. The computer case of claim 6 where the plurality of resilient ribs extend above the resilient material on the exterior surface of the case.

* * * * *

UNITED STATES PATENT AND TRADEMARK OFFICE
CERTIFICATE OF CORRECTION

PATENT NO. : 6,977,809 B2
DATED : December 20, 2005
INVENTOR(S) : Jerald A. Bovino It is certified that error appears in the above-identified patent and that said Letters Patent is hereby corrected as shown below:

<u>Column 4,</u>
Line 31, delete "form" and insert -- from --.

Signed and Sealed this

Eighteenth Day of April, 2006

JON W. DUDAS
*Director of the United States Patent and Trademark Office*